US008262019B2

(12) United States Patent
Schmidt et al.

(10) Patent No.: US 8,262,019 B2
(45) Date of Patent: Sep. 11, 2012

(54) METHOD AND SYSTEM FOR HEALTH MONITORING OF AIRCRAFT LANDING GEAR

(76) Inventors: R. Kyle Schmidt, Pickering (CA); Steven A. Gedeon, Toronto (CA)

( * ) Notice: Subject to any disclaimer, the term of this patent is extended or adjusted under 35 U.S.C. 154(b) by 0 days.

(21) Appl. No.: 13/271,468

(22) Filed: Oct. 12, 2011

(65) Prior Publication Data

US 2012/0053784 A1 Mar. 1, 2012

Related U.S. Application Data

(63) Continuation of application No. 11/281,504, filed on Nov. 18, 2005, now abandoned.

(30) Foreign Application Priority Data

Nov. 18, 2005 (CA) ..................... 2487704

(51) Int. Cl.
 *B64C 25/00* (2006.01)
 *B64C 25/52* (2006.01)
 *B64C 25/60* (2006.01)
(52) U.S. Cl. ................. 244/100 R; 244/103 R; 244/194
(58) Field of Classification Search ............... 244/75.1, 244/76 R, 194, 103 R, 100 R
See application file for complete search history.

(56) References Cited

U.S. PATENT DOCUMENTS

| 4,312,042 A | 1/1982 | Bateman |
| 4,480,480 A | 11/1984 | Scott et al. |
| 4,850,552 A | 7/1989 | Darden et al. |
| 5,446,666 A | 8/1995 | Bauer |
| 6,289,289 B1 | 9/2001 | Zweifel |
| 6,354,152 B1 | 3/2002 | Herlik |
| 6,676,075 B2 | 1/2004 | Cowan et al. |
| 6,745,153 B2 | 6/2004 | White et al. |
| 6,880,784 B1 | 4/2005 | Wilkinson et al. |
| 6,902,136 B2 | 6/2005 | Mackness |
| 2002/0199131 A1 | 12/2002 | Kocin |
| 2003/0209063 A1 | 11/2003 | Adamson et al. |
| 2004/0011596 A1 | 1/2004 | Miller et al. |

(Continued)

FOREIGN PATENT DOCUMENTS

WO 02/12043 A1 2/2002

(Continued)

OTHER PUBLICATIONS

International Preliminary Report on Patentability issued by the he Canadian Intellectual Property Office dated May 22, 2007 for corresponding International Application No. PCT/CA2005/001750 filed Nov. 18, 2005.
Extended European Search Report issued by the European Patent Office dated Feb. 4, 2010 for corresponding European Patent Application No. 05808070.6.

*Primary Examiner* — Philip J Bonzell
(74) *Attorney, Agent, or Firm* — Aaron Edgar; Gowling Lafleur Henderson LLP

(57) ABSTRACT

The invention relates to a new method and system for health monitoring of aircraft landing gear. The system includes sensors that are attached to the landing gear structure and equipment (e.g., one or more of brakes, tires, hydraulics, electrical systems and switches) and analyzed to report and alert personnel such as pilots, maintenance personnel, airline operators, ground crew and regulatory authorities of the health of the landing gear and the potential need for service, maintenance or replacement. The system monitors and reports critical health issues as real-time information which can be analyzed in conjunction with an extensive database of information and used to alert pilots or other relevant personnel to the condition of the landing gear and actions that may be required as a result.

27 Claims, 9 Drawing Sheets

U.S. PATENT DOCUMENTS

| | | |
|---|---|---|
| 2004/0075022 A1 | 4/2004 | Mackness |
| 2004/0102918 A1 | 5/2004 | Stana |
| 2004/0129834 A1 | 7/2004 | Luce |
| 2004/0225474 A1 | 11/2004 | Goldfine et al. |
| 2006/0004499 A1 | 1/2006 | Trego et al. |

FOREIGN PATENT DOCUMENTS

| | | |
|---|---|---|
| WO | 2004/013785 A2 | 2/2004 |

Figure 2
Figure 2A
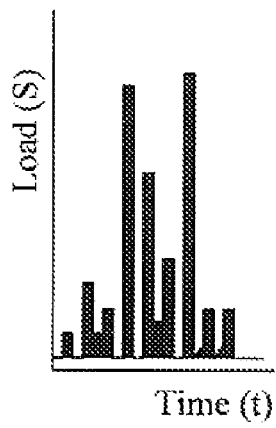
Figure 2B
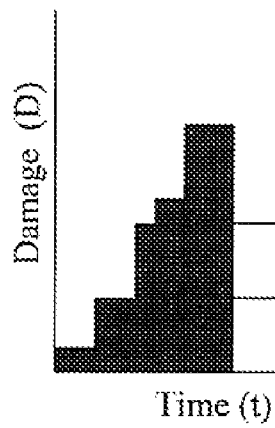
Figure 2C
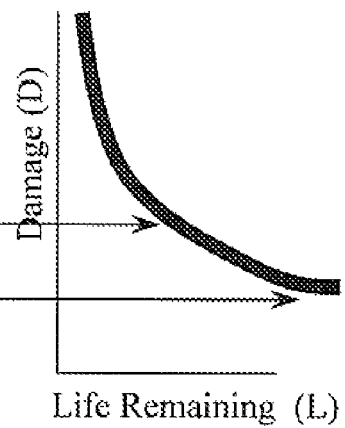

METHOD AND SYSTEM FOR HEALTH MONITORING OF AIRCRAFT LANDING GEAR

CROSS-REFERENCE TO RELATED APPLICATION

This application is a continuation of earlier filed nonprovisional application having application Ser. No. 11/281,504 filed Nov. 18, 2005, which in turn claims priority to Canadian Patent Application No. 2,487,704 filed Nov. 18, 2004, and incorporates by reference the disclosures of both said applications in their entirety.

FIELD OF THE INVENTION

The present invention relates to aircraft landing systems and more particularly to a method and system for determining whether the landing gear is healthy or whether it requires maintenance, service and/or replacement. This invention will also determine if the risk of a catastrophic failure of the landing gear has changed as a result of its in-service operations.

BACKGROUND OF THE INVENTION

The goal of health monitoring technologies is to know at any time, for any aircraft in the fleet, the structural integrity of the landing gear, the amount of remaining fatigue life in the landing gear, the landing gear servicing information (such as shock strut pressure and fluid volume, tire pressure and temperature, and brake condition), and the internal status of all on-board electronics and systems related to the landing gear system.

Being able to measure and assess the safety and integrity of the landing gear and landing gear system is of vital interest to the public safety.

The current process for deciding that an airplane has had a "hard landing", and thus has compromised the safety and integrity of the landing gear, is based on a subjective assessment by the flight crew. Because of the lack of reliable quantitative data, errors are made in this assessment. As a result, an airplane may be grounded unnecessarily, at a considerable cost of time and money, or conversely, a damaged airplane can continue in service, thus compromising public safety.

In addition to this current practice, servicing and maintenance are scheduled to take place at pre-determined intervals. This results in some servicing and inspections taking place before it is required, thus resulting in considerable additional cost of time and money. Conversely, in some cases, the landing gear may be in need of servicing, maintenance or replacement before the next scheduled time. In the interests of the public safety, it is better to be safe than sorry and so maintenance and servicing schedules tend to be very conservative.

Landing gear health monitoring systems involve several unique issues that differentiate it from all other airplane systems and the airframe itself. Airframes are made from relatively ductile aluminum alloys that can withstand relatively long cracks that grow over time. These aluminum structures can sustain fairly significant corrosion before the airplane's fitness for service is compromised. In contrast, landing gears are made from very high strength (but relatively low toughness) steel, aluminum, and titanium alloys with critical defect sizes that are much smaller.

This significant difference is also reflected in the fact that aircraft design and approval methodologies are quite different between the airframe and the landing gear. For example, the airframe uses "damage tolerant" design methodologies, which allow cracks of known sizes to exist in structural members, applied to fatigue dominated zones in the airframe compared to "safe life" design methods, which do not permit cracks, used in the landing gear.

As a result, many of the technologies and articles related to health monitoring of the airframe, e.g. measuring the dynamic characteristics of the structure and then inferring whether certain joints have failed or cracks have grown, are of little interest when considering health monitoring of the landing gear. Similarly, the sensors and technology involved for airplane systems are not sensitive enough to resolve the very small defects of interest or displacements of interest for landing gear applications.

The present invention provides a system and method that utilizes extensive destructive and non-destructive testing and analysis of full-scale landing gear, extensive engineering modeling of the landing gear design and modeling of the causes of failure, and extensive experience with analysis of landing gears in-service. This integrated system and method utilizes an arrangement of sensors and sub-systems and an extensive database of information such as the original manufactured condition of the landing gear, amount and type of maintenance, in-service history of similar landing gear, history of the specific landing gear of interest, prior in-service loads, and number and type of hard landings; and sophisticated analytical techniques in order to determine the safety of the landing gear and/or need for service, maintenance or replacement. The present invention can disseminate and report the need for service, maintenance or replacement to a spectrum of interested parties including: pilots and flight crews, maintenance personnel, airline operators, ground crew and regulatory authorities.

SUMMARY OF THE INVENTION

The present invention provides a system having a variety of sensors attached to the landing gear structure and equipment, a method and system to communicate the data measured by the sensors to the monitoring system, a method to analyze the data to derive relevant information about the health and safety of the landing gear, and a method and system to report the potential need for service, maintenance or replacement to pilots and flight crew, maintenance personnel, airline operators, ground crew and regulatory authorities.

In one embodiment the present invention provides an aircraft landing gear health monitoring system comprising at least one sensor coupled to at least one component of the aircraft landing gear system for measuring and recording real-time data associated with the status of at least one component. The system also includes at least one processor connected to the at least one sensor for receiving and processing the real-time data to calculate the condition of the at least one component of the landing gear system and reporting means operable to receive information from the at least one processor for reporting at least one of the condition of the landing gear system and the real-time data.

In another embodiment the present invention provides an aircraft landing gear health monitoring system comprising a plurality of sub-systems and a reporting device connected to each of the sub-systems for receiving data from the sub-system. Each sub-system comprises a plurality of sensors each independently connected to separate components of a pre-determined sub-system of the aircraft landing gear and operable to measure and record real-time data associated with the status of each component and a processor connected to the plurality of sensors for receiving the real-time data therefrom and operable to analyse the real-time data to calculate the condition of the sub-system. The reporting device is operable to report at least one of real-time data and the condition of each of the sub-systems.

In a further embodiment, the present invention provides an aircraft landing gear health monitoring system comprising at least one sensor coupled to at least one component of the aircraft landing gear system for recording real-time data associated with the at least one component, a processor operable to receive and compare the recorded real-time data with predetermined health data associated with the at least one component and to calculate the condition of the at least one component, a communication device operable to communicate with the at least one sensor and the processor, and to receive information relating to the real-time data, the analysed data and the calculated condition of the at least one component and reporting means connected to the communication device and operable to receive and report information received therefrom relating to at least one of the real-time data, the analysed data and the condition of the at least one component.

In an alternative aspect the present invention provides a method for monitoring the health of an aircraft landing gear system comprising the steps of (i) collecting real-time data associated with the condition of at least one component of the aircraft landing gear system, (ii) analysing the real-time data to assess the condition of the at least one component and (iii) reporting the condition of the at least one component.

In an alternative embodiment of the present invention provides a method for monitoring and diagnosing the health of an aircraft landing gear system comprising the steps of (i) recording real-time data associated with the status of at least one component of the aircraft landing gear system, (ii) transmitting the real-time data to a processor for processing, (iii) processing the real-time data to calculate the current condition of the at least one component and to determine if any maintenance is required and (iv) reporting at least one of the real-time data, the calculated condition and any required maintenance.

In addition, the method described above may also include repeating steps (i) and (ii) for additional sub-systems. The method may occur while the aircraft is in flight or while it is on the ground. The methods described above may also include the additional step of transmitting at least one of the real-time data, the calculated condition and any required maintenance to a ground-based master landing gear database.

BRIEF DESCRIPTION OF THE DRAWINGS

The present invention will be described in further detail below with reference to the attached figures in which:

FIGS. 2A-2C are a series of graphs showing the transformation of load data into load-damage data;

DETAILED DESCRIPTION OF THE PREFERRED EMBODIMENTS

The invention relates to a new method and system for health monitoring of aircraft landing gear. The invention includes the use of a plurality of sensors that are attached to separate components of the landing gear structure and equipment (e.g., one or more of brakes, tires, hydraulics, electrical systems and switches) and analyzed to report and alert personnel such as pilots, maintenance personnel, airline operators, ground crew and regulatory authorities of the health of the landing gear and the potential need for service, maintenance or replacement.

The individual sensors measure and record data related to the component(s) to which it is attached, e.g. a sensor attached to the shock strut may measure oil pressure, level, and/or temperature; a sensor attached to a tire may measure the tire pressure. The sensors that may be used are known in the art and may be either releasably or permanently attached to the component after manufacturing or may be connected to the component during the original equipment manufacturing operations. The data collected from the sensor(s) is then either directly or indirectly, through analysis and/or manipulation, used to report a health issue which may be directly connected to the component being monitored, e.g. a flat tire, or indirectly related, e.g. low tire pressure that affects the braking system.

The present system is operable to monitor and report critical health issues associated with the landing gear such as the in-service loads due to landing and taxiing, the presence of structural defects such as cracks or pre-crack material damage, tire pressure, tire temperature, brake wear, hydraulic pressure, the status of on-board electronics, the status of the equipment and wiring, and the overall condition of the landing gear and ability to sustain another landing. This real-time information, also referred to herein as real-time data, can be analyzed in conjunction with an extensive database of information, also referred to herein as pre-determined health data, such as the original manufactured condition of the landing gear, amount and type of maintenance, in-service history of similar landing gear, history of the specific landing gear of interest, prior in-service loads, and number and type of hard landings in order to determine the safety of the landing gear and/or need for service, maintenance or replacement. The real-time information and/or information analyzed in conjunction with the database, can be used to alert pilots using a cockpit display screen and/or to alert the aircraft owners, operators, maintenance staff, ground crew and regulatory authorities via remote transmission providing such personnel with the option to take actions such as additional inspection, service, maintenance and/or replacement of the landing gear.

The present invention will now be discussed in further detail with reference to the attached FIGS. 1-9.

Figure 1:
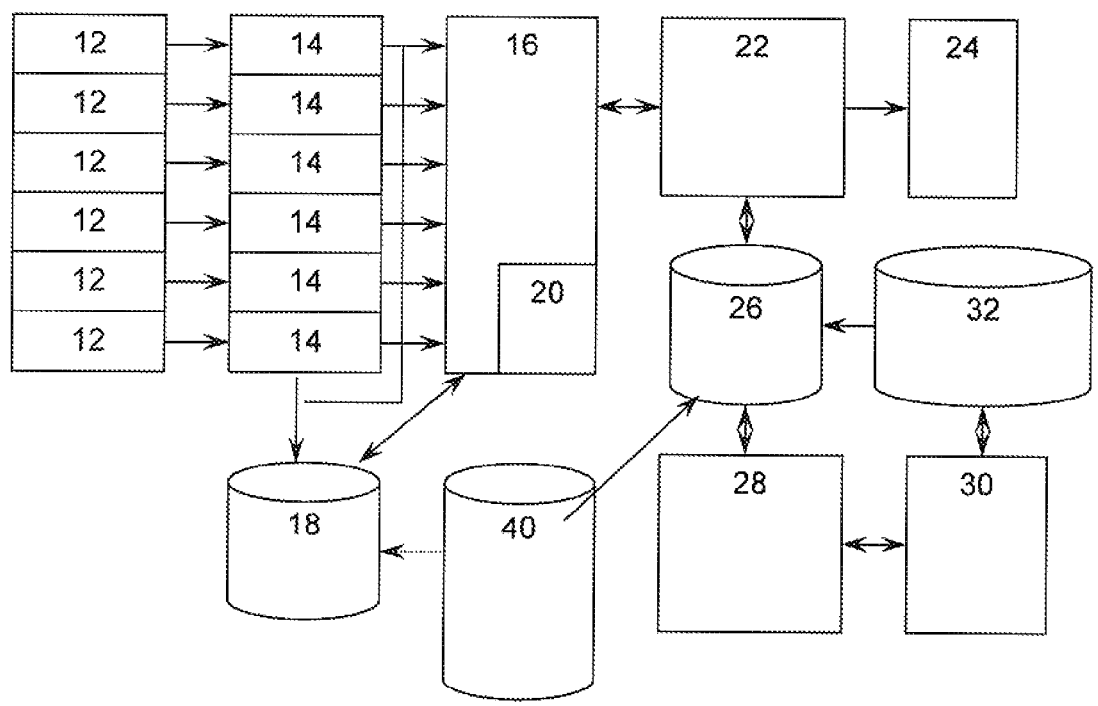
FIG. 1 is a schematic of one embodiment of the health monitoring system of the present invention.

One embodiment of the health monitoring system 10 of the present invention is illustrated in FIG. 1 and includes a plurality of sensors 12 independently connected to separate components of the landing gear structure and equipment of an aircraft, not shown. The system 10 also includes a processor 16 to process and communicate the data received from the sensors 12. The processor 16 analyses the data received from the sensors 12 to ascertain the status of the landing gear structure and may also compare the analysed data to pre-determined health data to determine the current condition of the landing gear relative to the historic condition. The processor 16 then reports the condition of the landing gear using a display 24 to at least one relevant personnel. The displaying of the information may be in the form of a query and reporting system that will be described in further detail below.

The system 10 may also include at least one signal conditioning device 14 connected to the plurality of sensors 12 and the at least one processor 16. In the illustrated embodiment, the system 10 includes a plurality of signal conditioning devices 14 connected to the plurality of sensors 12. The plurality of signal conditioning devices 14 are in turn connected to the processor 16.

It will be understood that the processor 16 and the plurality of signal conditioning devices 14 may be separate components or may be one unitary component, i.e. the processor 16 may be operable to receive data directly from the sensors 12. Further the plurality of signal conditioning devices 14 may in fact be one unitary signal conditioning device 14 that is connected to each sensor 12 and to the processor 16. Further, each sensor 12 may be connected to one signal conditioning device 14 or to several signal conditioning devices 14 or alternatively each sensor 12 may be directly connected to one central processor 16.

In one embodiment, the signal conditioning device 14 is operable to receive data from the sensor(s) 12 and convert it into a form that the processor is able to understand and analyse. As an example, the signal conditioning device may be an analog to digital converter to transfer the sensor information into a form that the processor can understand.

In an alternative embodiment, the signal conditioning device 14 may include a component for conditioning the data received which in turn is connected to a network bus or alternatively the data may be transferred from the sensor 12 to the network bus and then be converted into a form that the processor is able to understand and analyse. It will therefore be understood that the signal conditioning device 14 may be in the form of a distributed system where the sensor data is communicated over a network or communications bus, such as ARINC-429, AFDX, CANbus or Time Triggered Protocol—or other similar devices known to a person skilled in the art.

It will also be understood by a person skilled in the art that each different type of sensor will require suitable interface circuitry to adapt it to be read by the processor. For instance, strain gauged based sensors need excitation, amplification, filtering, and then conversion from the analog domain to the digital domain. A capacitive fluid level sensor may require conversion either using a direct to digital converter, or by using a capacitive bridge circuit, excitation circuitry, an demodulation circuitry. Preferably, the sensors will be of an analog nature, with the exception of sensors that behave like a switch, e.g. proximity sensors.

An appropriate number and type of sensors 12 are attached to the components of the landing gear (not shown) in appropriate locations for each component to be monitored which will be described in further detail below. It will be understood that a person skilled in the art will know where particular sensors 12 should be located and how to attach them to a component of the landing gear. It will be understood that the choice of number and type of sensor 12 may vary depending on the type and number of components to be monitored. The minimum number of sensors 12 may depend on both the geometry of the landing gear, and the information desired. For example, the system may include only one sensor if a small amount of specific data is required whereas other systems will require additional sensors. The state of some components may be assessed using data from one particular sensor or from a combination of sensors.

Examples of the types of sensors 12 and components to which the sensors 12 may be attached include, but are not limited to, tires, brakes, hydraulics, electronics, landing gear doors, oil pressure, oil temperature, oil level, shock strut position, loads, strain gauges, structural integrity, magnetic permeability, brake pressure, and aircraft bus data including airplane velocity, position, attitude and altitude As an example, in a system for measuring the servicing state of the shock strut, a measurement of one of the following could be used alone or in combination with the other measurements to assess the servicing state: internal oil pressure, oil level, shock strut extension, and oil temperature. Alternatively, one could not measure the oil level and instead use a stored measurement that was made with the aircraft in flight—two sets of data at known conditions—strut position, temperature, and pressure can be used to determine the service state. For the determination of the loads through the landing gear, the landing gear geometry directly affects how this can be achieved—there are three loading directions of interest—vertical, side, and drag—these could define a minimum.

This real-time data, i.e. the data recorded by each sensor 12, may be conditioned or transformed, by either the sensor itself or the signal conditioning device 14 or the processor 16, into information that is more directly relevant to a condition to be monitored and reported (e.g. converting voltage to pressure). For example, if a communications bus is used the sensors may be of the 'smart sensor' variety. Therefore, the sensors may employ a local microprocessor, signal conditioning circuitry, and data conversion circuitry to convert the measured signal to a digital signal, then relay that signal over the communications bus to the processor 16.

This information may then be analysed in conjunction with an on-board database 18, containing the pre-determined health data associated with each component, by the processor 16 based on pre-determined algorithms, heuristics, or alternative methodology such as neural networks or fuzzy logic. This set of analytical techniques may be referred to as the "Analysis Method Library" and is indicated generally by numeral 20. It will be understood that the analytical techniques may be stored in the processor 16 or may be stored within a system with which the processor 16 is operable to communicate to retrieve the required information. Likewise the on-board database 18 may be part of the processor 16 or may be a separate component in communication with the processor 16.

The resulting analysis determines the landing gear condition and may be reported, along with any alerts deemed necessary as a result of the analysis through a display 24 accessible by, for example, the on-board crew including the pilot(s), co-pilot(s) and flight crew. Alternatively, the display 24 may be part of a ground-based system that is in communication with the processor 16 and is accessible by ground personnel.

In an alternative embodiment the system 10 includes a communications sub-system 22 that receives the information relating to the condition of the landing gear components from the processor 16 and in turn communicates the information to the display 24. The communications sub-system 22 may be part of the processor 16 or may be a co-processor. The sub-system 22 is operable to collect all communications into and out from the processor 16, and optionally all other components in the system 10. The sub-system 22 provides a separate communication from the processor 16 if desired or required.

Examples of the types of alerts that may be transmitted as a result of the analysis include, but are not limited to: the remaining life of the landing gear; the need for servicing; the need for maintenance; the need for inspection and a calculated risk of failure of the landing gear upon next landing.

The communications sub-system 22 and/or the processor 16 may also be operable to communicate with a ground-based master landing gear database 26. Therefore, all relevant information may be transmitted between the communications sub-system 22/processor 16, including the on-board database 18 and the ground-based master landing gear database 26 which, will allow for any updates of information from the master landing gear database 26, for example to the algorithms used to be made. The master landing gear database 26 may include information such as landing gear system information, i.e. built in test results for each piece of avionics, reported anomalies, brake system information, i.e. brake temperatures, pressures, wear information, tire information, i.e. tire pressure, tire wear information, tire temperatures and landing gear information, i.e. landing gear usage including loads, forces, time histories, individual part fatigue information and life consumed. Preferably the master landing gear database 26 includes at least the landing gear information.

When the information is communicated to the ground-based master landing gear database 26, the status of the landing gear and/or alerts can be sent through a reporting sub-system 28 to the aircraft owners and operators, maintenance staff, ground crew, and regulatory authorities, indicated generally at 30, who may decide to take actions such as additional inspection, service, maintenance and/or replacement of the landing gear. Any actions taken on the landing gear, such as servicing, maintenance or inspection, indicated generally at 32, can then be entered and uploaded back to the master landing gear database 26, which can in turn update the on-board database 18 in preparation for the next takeoff.

In an alternative embodiment of the invention, there are multiple sub-systems that are included in the overall system. The sub-systems each focus on one component of the aircraft, including structural, tires, brakes, hydraulics, electronics, position, communications, database, analysis, and reporting. Each modular sub-system is dedicated to obtaining, conditioning and analyzing information of interest regarding the component. However, the information recorded by each sub-system can be shared between sub-systems and used to assess the condition of other components in the overall system.

In one example, a structural integrity sub-system is provided in which the sensors 12 are attached directly onto the structural portions of the landing gear, either during a retrofit operation or during the original manufacture. These sensors 12 are used to measure all relevant loads experienced by the structure during taxiing, take-off and landing, including, but not limited to, for example torsional, axial, fatigue and shock loads. The data recorded by the sensors 12 of the system may then be processed to calculate information related to the presence of defects, discontinuities and/or pre-crack damage to the structure. This information can then be used to calculate the current health of the landing gear structure which in turn can be compared to the original manufactured condition of the landing gear.

In another example, in order to monitor the tire pressure a pressure sensor is attached to the tire in such a way as to obtain and communicate the pressure information to the monitoring system or brake monitoring sub-system. In order to monitor the loads on the structure, load sensors are attached to the structure in the appropriate locations so as to obtain and communicate the load information to the monitoring system or structural integrity monitoring sub-system.

The sensor information is analyzed in a variety of ways, depending on the specific sub-system. For example, the tire pressure sensor can measure the pressure directly. By knowing the change in tire pressure over time, an assessment can be made whether the tire is leaking air. Depending on rate of pressure decrease, ambient temperature, prior service history, e.g. if a valve has just been replaced, and correlation with tires in the rest of the fleet, an assessment may be made to replace the tire, fix a valve stem, simply re-inflate the tire, or leave the tire alone because the pressure drop was caused by a drop in ambient temperature.

Each sub-system will have its own method for analyzing the raw sensor information, conditioning or converting the raw information into more directly relevant information as appropriate, e.g. converting voltage to pressure or converting the time rate of voltage change to magnetic permeability to the presence of pre-crack damage, analyzing the information in conjunction with a database of information and reporting the need for service, maintenance or replacement.

The real-time information from each sub-system can be analyzed in conjunction with an extensive database of information such as the original manufactured condition of the landing gear, amount and type of maintenance, in-service history of similar landing gear, history of the specific landing gear of interest, prior in-service loads, and number and type of hard landings in order to determine the safety of the landing gear and/or need for service, maintenance or replacement.

The real-time information and/or information analyzed in conjunction with the database, can be used to alert pilots using a cockpit display screen, and/or remotely transmitted to the aircraft owners and operators, maintenance staff, ground crew, and regulatory authorities who may decide to take actions such as additional inspection, service, maintenance and/or replacement of the landing gear.

Determining the number, location and type of these sensors 12 requires engineering modeling and testing of the landing gear in order to optimize performance and sensitivity. It should be noted that the number, location, and type, e.g. number of windings, of sensors 12 will be identical from one set of landing gear to another within a given type of landing gear, but will vary from one type of landing gear to another depending on the engineering design analysis and full scale destructive testing results. The raw data taken from the load sensor must be conditioned in order to determine the actual load.

The following provides an example of the type of analysis that may be performed. Analysis of the in-service loads measured using the structural integrity sub-system can be used to determine the weight and balance of the airplane, presence of hard landings, and other loads that may contribute to a reduction in the remaining useful life of the structure. Generally, the most common way for engineers to measure the life of a structure is to construct a S-N Curve showing the number of cycles to failure (N) for a given applied load (S). Statistical analysis is used to predict the probability of failure of a landing gear that has experienced a certain number of cycles of a given load. However, if the landing gear is subjected to several significantly higher loads than S, the effect on the remaining number of cycles to failure (N) is far more difficult to calculate. Furthermore, during the lifetime of a landing gear there will be large fluctuations in the range of loads (S), requiring a more sophisticated technique for assessing the total amount of load-damage (e.g. a modification to the calculation of S which we will name "D") and thus remaining useful life (a modification to the calculation of N which we will name "L"). The structural integrity sub-system must continually update the actual D that the particular landing gear has been subjected to, so as to continuously be calculating the remaining number of cycles to failure (L) and probability of failure for any potential future landing (e.g. the probability of failure during a hard landing will be different than the probability of failure during a soft landing).

As an example, FIG. 2A-C show a graphical illustration of how to transform the load data (S) into more relevant information (D). As can be seen, certain small loads may not affect the overall damage, however, a large load may cause a significant increase in the damage. In the example shown in FIG. 2A-C, the first set of loads (S) cause a slight increase in D. However, this slightly increased D has almost no effect on the Life Remaining (L), as shown in the lower arrow that points from the second graph to the third graph. In contrast, a higher load, such as shown taking place at a later time (t), can increase the damage further resulting in a significant effect on the Life Remaining (L), as shown in the top arrow that points from the second graph to the third graph.

Figure 3:
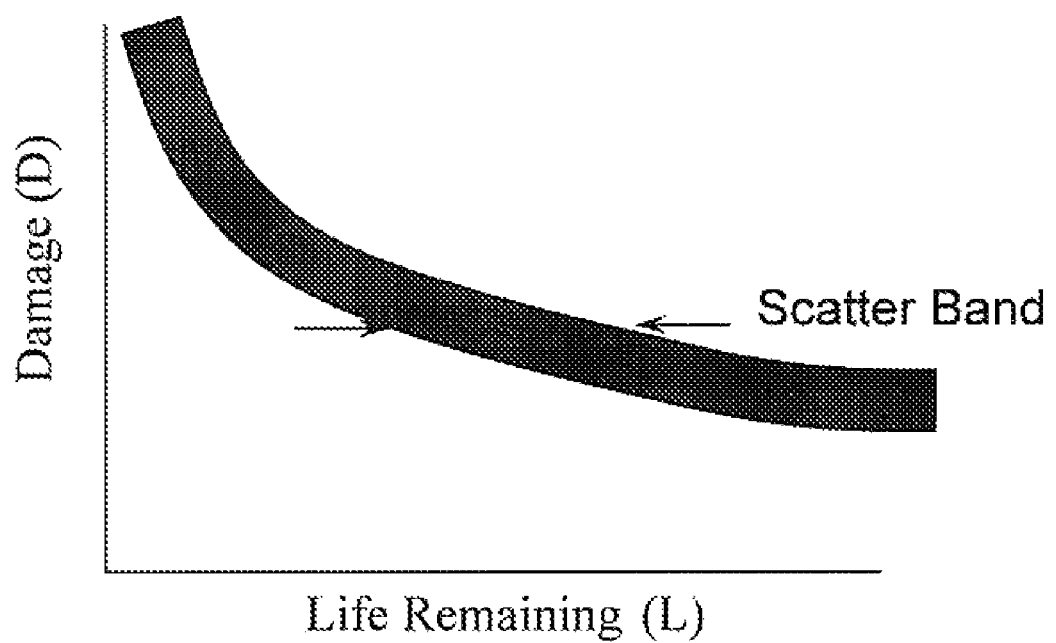
FIG. 3 is a graph showing damage versus life remaining.

As shown in FIG. 3, there may be significant scatter in the experimental data when performing actual destructive tests on full-scale landing gear. For example, seemingly identical specimens may have a significant difference in the number of cycles to failure or remaining life. This uncertainty is addressed using statistical analyses as well as conservative projections. As can be seen from FIG. 3, using a conservative remaining life projection (the lower edge of the curve) may result in almost half of the anticipated lifetime compared to using the projection from the centre or top of the curve.

Therefore, using only the directly measured in-service loads to predict remaining life will result in very conservative predictions. However, these predictions can be significantly improved, often resulting in a much higher calculated remaining life, if the D-L curve can be modified based on additional sources of information such as direct measurement of the damage, knowledge of the original manufactured condition, and knowledge of the service history of the landing gear. A system, as provided by the present invention, that includes continual monitoring of the landing gear components and a comparison of the monitored data with pre-determined structural health measurements provides more accuracy to such calculations.

In an alternative embodiment, the sensors 12 in the structural integrity sub-system will also directly measure the material properties in a way that will provide direct evidence of the presence of defects and/or pre-crack damage. In one embodiment of the invention, meandering winding magnetometer sensors are used to measure the magnetic permeability of the material in such a way as to be highly correlated with the presence of defects and/or pre-crack damage. An example of the sensors that may be used are the sensors manufactured by Jentek Sensors Inc.

Each landing gear has its own continuously updated D-L curve, that calculates the remaining life (L) as a function of the total spectrum of applied loads, which are used to calculate (D). However, once a defect, crack or pre-crack defect has been found, for example by measuring the magnetic permeability of the material, the D-L curve will be shifted to a new D-L curve which shows a lower remaining life, which will be named "Ld" for L in the presence of a known defect.

In another embodiment, the original manufactured condition of the landing gear is known. This is achieved by creating a "birth certificate" or "fingerprint", indicated generally at 40 in the schematic of FIG. 1, for each newly manufactured landing gear composed of a three dimensional geometric inspection and complemented with enhanced non-destructive inspection results, such as magnetic permeability or Barkhausen noise inspection. The "birth certificate" or "fingerprint" establishes the part's expected fatigue and strength performance. The "birth certificate" includes such data as non-destructive inspection results, surface discontinuities, coating thickness, tube wall thickness, heat treatment history, repair and rework occurring during manufacturing. By comparing the in-service material properties, e.g. magnetic permeability or Barkhausen noise, the "new fingerprint"—to the original fingerprint, a better determination can be made as to the presence of a defect and/or pre-crack damage. Thus a better determination can be made as to the remaining useful life (Ld) of the landing gear. This information may be stored in the on-board database 18 along with the pre-determined health data for each component. Alternatively, the "birth certificate" or "fingerprint" for each component may be stored separately.

Using an array of information based on real-time data (e.g. load and magnetic permeability), provided by the sensors 12 and/or signal conditioning device 14 in conjunction with the on-board database 18 (e.g. prior birth certificate fingerprint of magnetic permeability) and sophisticated algorithms (e.g. the method for transforming S into D to calculate L or Ld) or heuristics, neural networks or fuzzy logic (e.g. the Analysis Method Library 20), the processor 16 can determine the need for service, maintenance or replacement.

The structural integrity sub-system can provide a plethora of useful information including weight and balance information (which is of immediate interest and concern to the pilot and flight crew who may wish to move passengers or decline to take-off until the weather has changed), hard landing indication (which may be used for regulatory authority notification), and notification that the remaining useful life has been compromised so that the landing gear can be removed, inspected, or serviced.

If a hard landing has taken place, the structural integrity sub-system can calculate the immediate effect of this on the remaining life of the landing gear and the cost of this reduction in life can be charged to the operator.

In a further embodiment, the sensors 12 in the health monitoring system are connected to a plurality of measurement and analysis units (not shown) (one per landing gear assembly) that are in close proximity to the sensors, and that contain internal, rechargeable power supplies. When the aircraft avionics are on (such as when the aircraft is flying or taxiing) the remote measurement and analysis unit(s), which are connected by electrical cabling to the aircraft avionics, are recharged by the aircraft electrical system and the measured data contained in the units are transferred to the aircraft avionics. This system permits the measurement of landing gear structural integrity when the aircraft power is not on (during towing, parking, and storage or maintenance activities). This facility provides the structural integrity sub-system with capability to detect damage during these times when conventional systems would not be operational. Considerable landing gear damage can occur when the aircraft is not powered on.

Alternatively, each sensor 12 may include its own source of power separate from the aircraft power system, which allows the sensor to continue to monitor data even when the aircraft power is switched off. In this embodiment, each sensor 12 for which continual monitoring is required, is equipped with, or connected to, a separate power supply/source.

In a preferred embodiment of the system, subsets of the Master Landing Gear Database including accrued Damage (D) information and available life (Ld) information will be stored (along with fingerprint information) in an electronic memory that is attached to components of the landing gear. As critical components of a landing gear may be removed for maintenance and replaced with other components from a rotatable pool of parts, a means is required to track the current composition of the landing gears on the airplane. By storing pertinent excerpts from the Master Landing Gear Database on the actual landing gear components, and by being able to retrieve them electronically (e.g. by using RFID tags and scanners) the processor 16 will always be aware of the exact damage status of the components on the aircraft. For example, if a component in the landing gear is changed when the aircraft is powered off, once the power is returned the processor 16 will automatically read and download the information about the component contained on it. This information will provide the processor 16 with all relevant damage information and the information will be updated by the processor 16 during and after flight. The central database can also be updated with the relevant information relating to the parts in use and any damage applied thereto.

In a preferred embodiment of the system, there will also be sub-systems for the following: tires (pressure, temperature, wear and remaining life), brakes (temperature, integrity, wear and remaining life), hydraulics (pressure, temperature and viscosity), electronics (power, integrity and status), position (of the landing gear doors and landing gear), communications (between the sensors, on-board systems, pilot cockpit display, on-board database, and ground-based systems), Master Landing Gear Database (of the maintenance history, in-service load history, similar landing gear systems, and maintenance history), and analysis and reporting (to show alerts, recommendations for servicing or maintenance, and provision of information).

Each of the above named sub-systems can be implemented using a similar methodology as described for the structural integrity sub-system: taking key data from sensors attached in the appropriate location, analyzing the data to determine critical information of interest (e.g. the condition of the brakes), and analyzing this information in conjunction with the on-board database by the central processing unit to determine the need to take actions such as alerting the pilot, performing additional inspection, removing the landing gear, and/or performing servicing or maintenance.

In another embodiment of the system, data collected from each of the sub-systems is returned electronically from the aircraft to an analysis center. Each report is accepted into a database system (such as Teamcenter from UGS) that attaches the data report to the data records for that part number and serial number of part or assembly. In the case of data returned from the structural integrity sub-system, data is electronically attached to a top level landing gear assembly. The software aligns all data records with original design specifications and as-built records. For structural data on an assembly, the data is automatically routed to individual data processing and analysis routines that generate the damage and life information for each sub component. This information is then automatically appended to the appropriate part numbers and serial numbers within the database. Upon completion, electronic messages are dispatched to the aircraft avionics to update the onboard databases, and to operators and customer service personnel.

Figure 4:
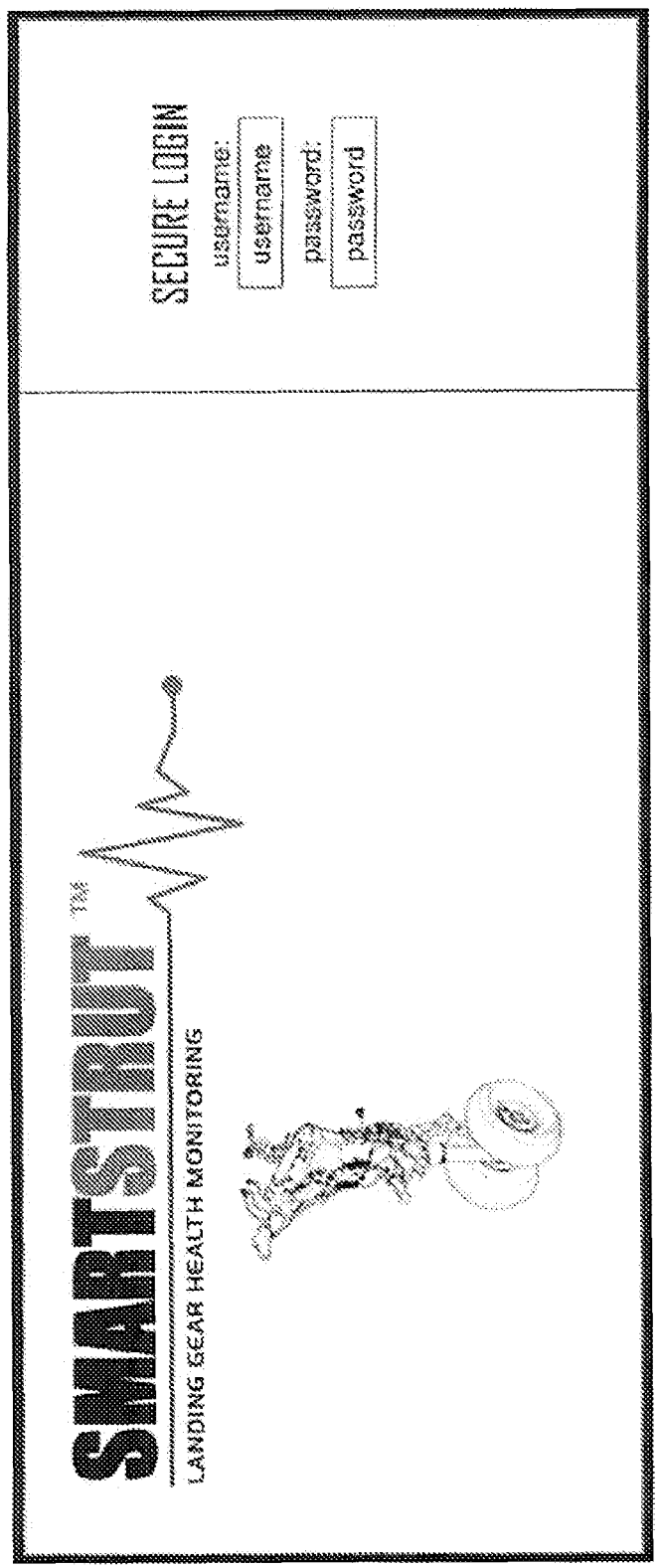
FIG. 4 illustrates one embodiment as initial screen of a user interface for the present invention.

FIGS. 4 through 9 demonstrate one embodiment of a user interface to the Querying and Reporting Sub-System for the present invention (in this example, using the trade name "SmartStrut—your landing gear health monitoring system"). As shown in FIG. 4, the system can be accessed using a standard web browser such as Microsoft Explorer or Netscape Navigator and can be password, protected to restrict access to conduct queries and permission to modify the database.

Figure 5:
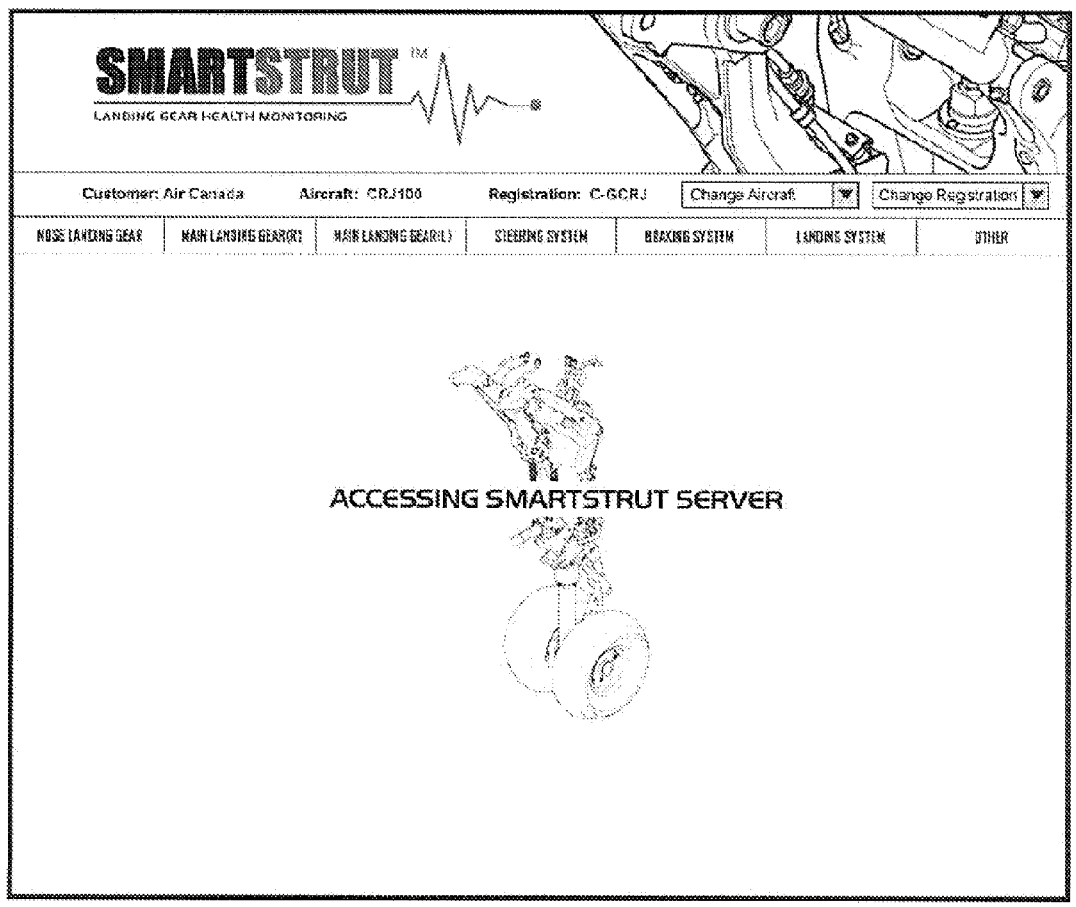
FIG. 5 illustrates a query screen of a user interface for the present invention.
Figure 6:
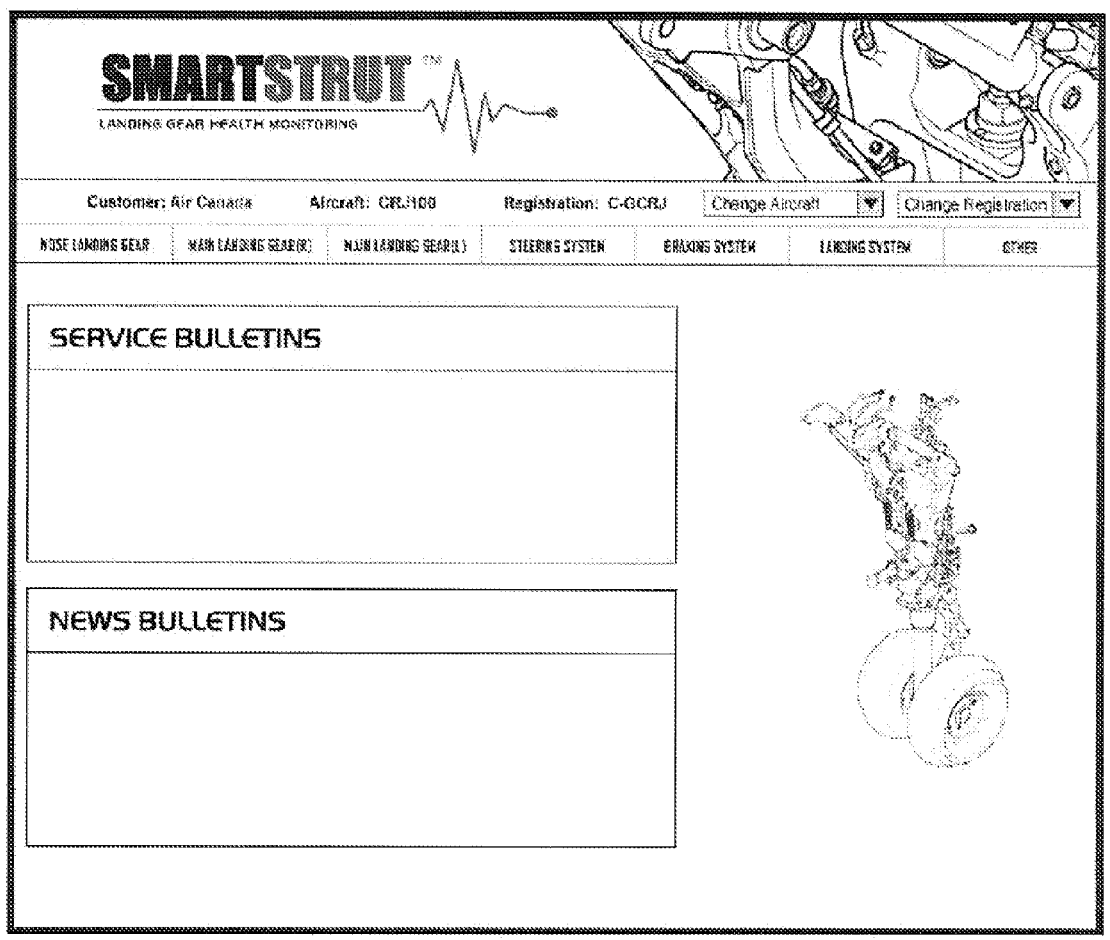
FIG. 6 illustrates a bulletin screen of a user interface for the present invention.
Figure 7:
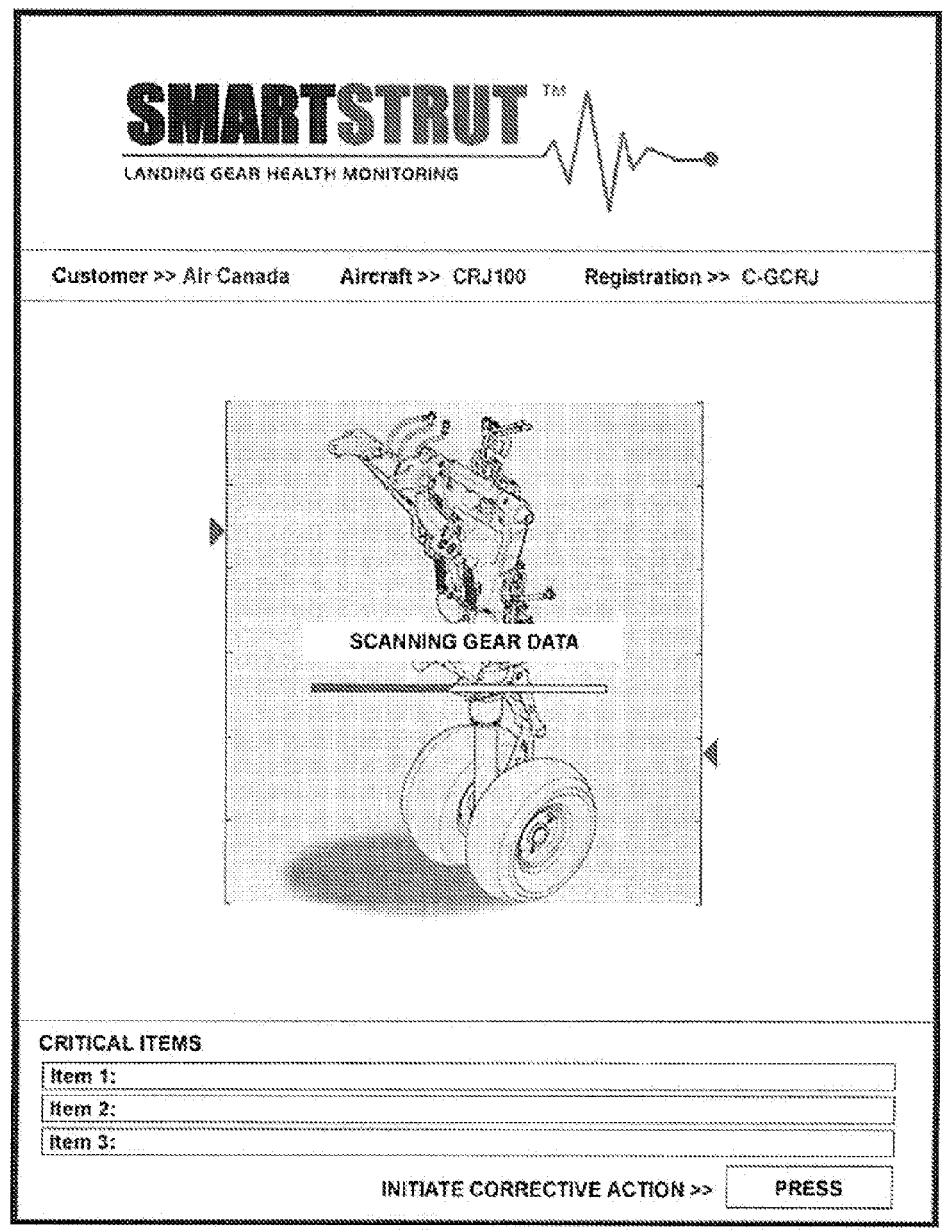
FIG. 7 illustrates a data accessing screen of a user interface for the present invention.
Figure 8:
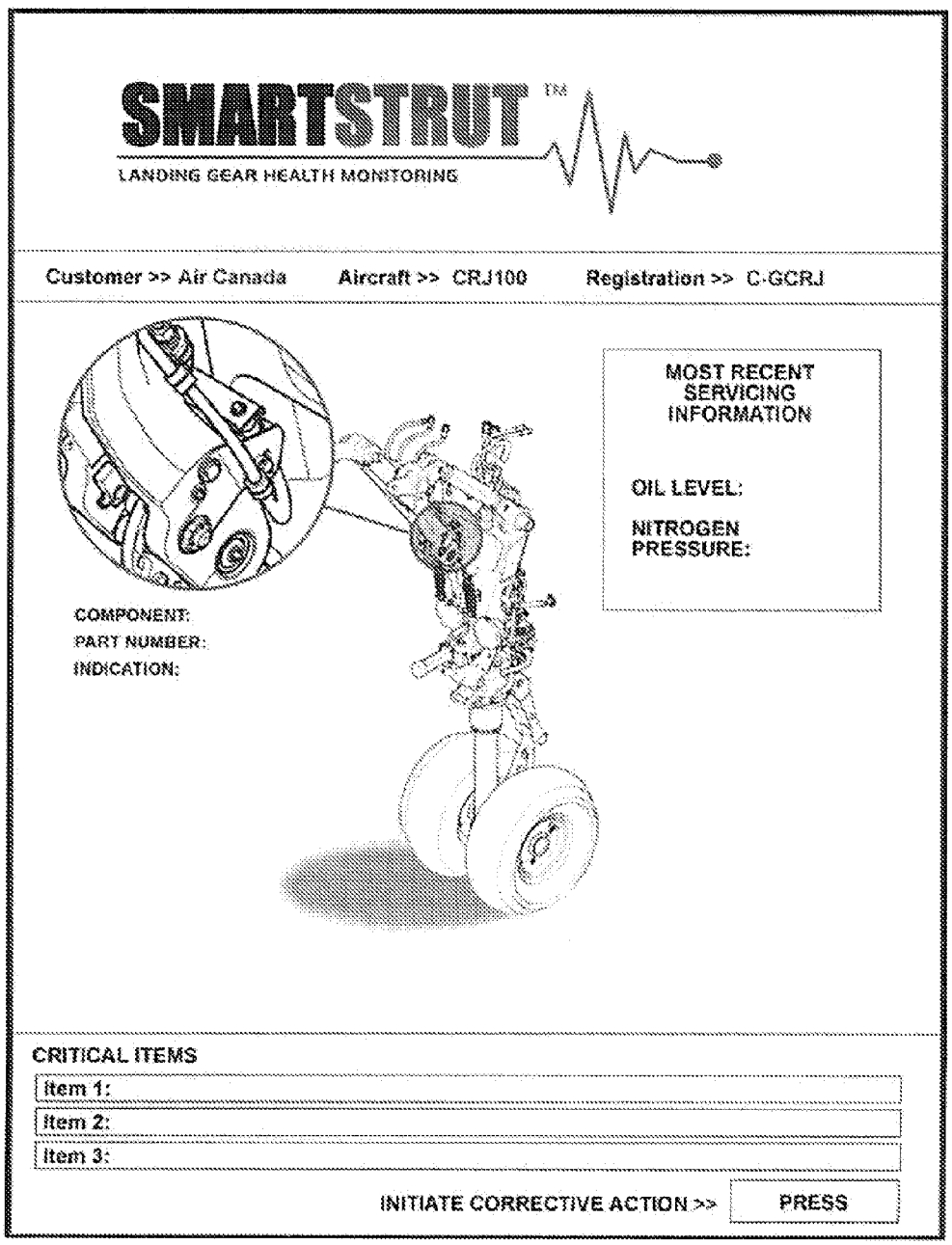
FIG. 8 illustrates a multi-data display screen of a user interface for the present invention.

FIG. 5 demonstrates the ability to conduct a query for a specific customer, aircraft and landing gear. FIG. 6 demonstrates the ability to tie into other databases such as service bulletins and news bulletins. FIG. 7 demonstrates the ability to directly access the real-time data and/or most recently updated information provided to the Master Landing Gear Database from the on-board systems. FIG. 8 demonstrates the ability to access information associated with several sub-systems at once, including a down-lock sensor component fault, the oil level and nitrogen pressure. As can be seen, simple heuristics can be used to determine the potential need for servicing. In this case, the heuristic for oil level is that the oil level is critically high when above one number and critically low if the oil level is below another number.

In one embodiment of the invention, the oil level, rate of change of oil level, nitrogen pressure, and rate of change of nitrogen pressure (and/or other information) are used to report a single value—"need to perform service", "no need to perform service", or "service needed soon".

Figure 9:
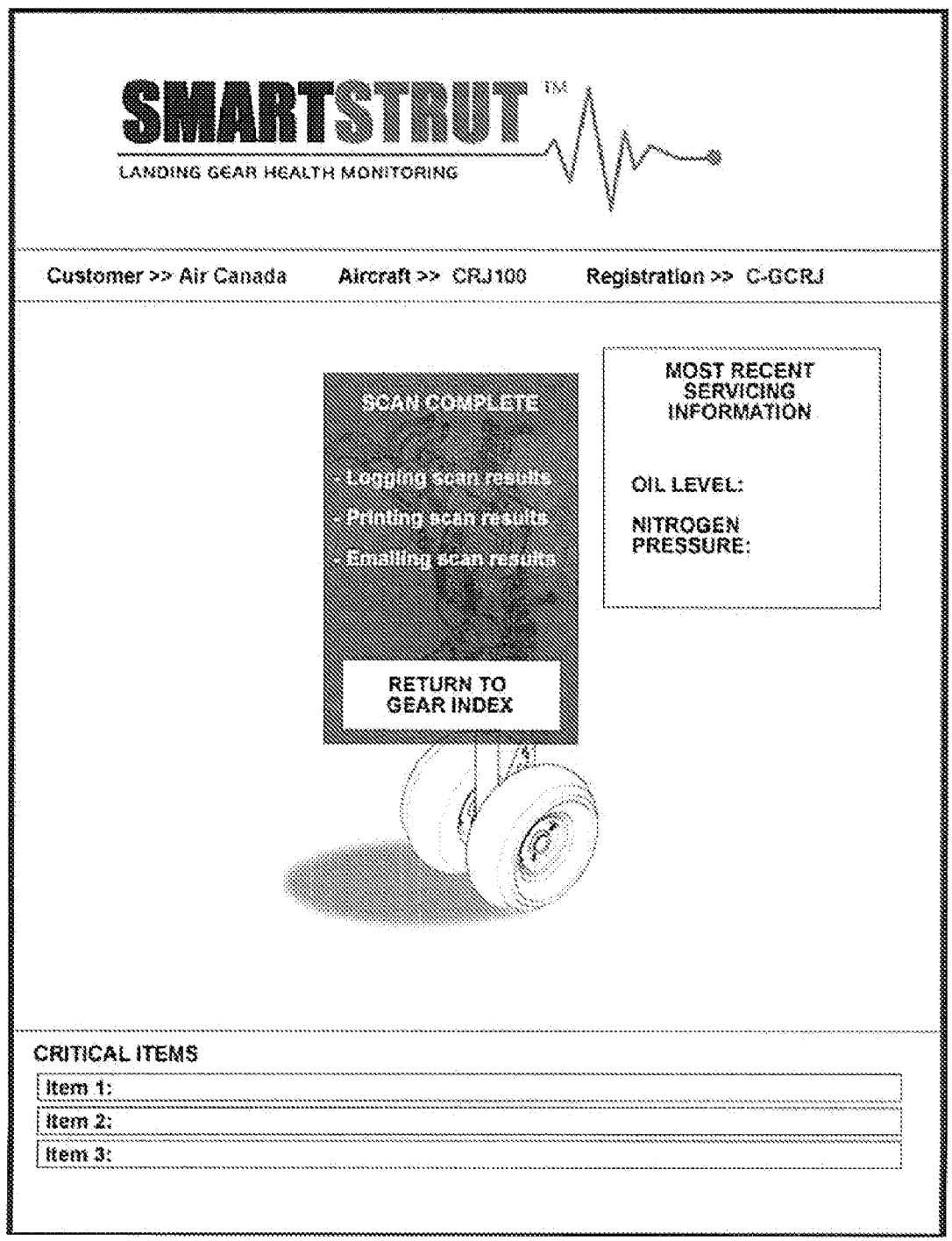
FIG. 9 illustrates a further query screen of a user interface of the present invention.

FIG. 9 demonstrates the ability to log the access to the system, email alerts and conduct further queries. Additional searching, querying, analysis and reporting functions are available through this user interface.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

The invention claimed is:

1. An aircraft landing gear health monitoring system for monitoring two or more replaceable landing gear components of the aircraft landing gear, the system comprising:

at least one sensor coupled to at least one of the two or more replaceable components of the aircraft landing gear for measuring real-time data associated with the status of at least one of the two or more replaceable components, the at least one sensor being configured to measure real-time data when the aircraft power is switched on and when the aircraft power is switched off;

at least one processor connected to the at least one sensor for receiving and processing the real-time data to calculate the current condition of the at least one replaceable component of the landing gear by comparing the real-time data to pre-determined health data associated with each component, the pre-determined health data including data relating to the historic condition of the at least one replaceable component, including actual fatigue and historic load conditions, the current condition comprising the probability of failure and the remaining useful life of the at least one replaceable component;

two or more electronic memory devices, each attached to a corresponding one of the two or more replaceable components of the aircraft landing gear system, the two or more electronic memory devices for storing the pre-determined health data related to the structural integrity of the attached replaceable component, wherein replacement of one of the replaceable components also replaces the attached electronic memory device and the pre-determined health data stored thereon, the two or more electronic memory devices each being operable to communicate the stored data to the at least one processor for comparison with the real-time data; and reporting means operable to receive information from the at least one processor for reporting at least one of the current condition and the real-time data.

2. The health monitoring system according to claim 1 wherein the each of the two or more replaceable components of the aircraft landing gear is selected from the group consisting of tires, brakes, hydraulics, electronics, landing gear doors, oil pressure, oil temperature, oil level, shock strut position, loads, strain gauges, structural integrity, magnetic permeability, brake pressure, aircraft bus data including airplane velocity, position, attitude and altitude.

3. The health monitoring system according to claim 1 wherein the reporting means is selected from the group consisting of a display screen located in the aircraft cockpit, a ground-based system, and a display screen located within the aircraft and accessible by at least one crew member.

4. The health monitoring system according to claim 1, further comprising at least one self powered measurement and analysis unit connected to and in communication with the at least one sensor and connected to an aircraft avionics system and configured to receive additional power therefrom when the aircraft avionics system is on, the measurement and analysis unit further operable to supply power to the at least one sensor and to receive and store real-time data from the at least one sensor when the aircraft power is off and further operable to transmit stored data received from the at least one sensor to the at least one processor when the aircraft avionics system is on.

5. The health monitoring system according to claim 1, wherein the at least one sensor and the reporting means are independently connected to the aircraft power supply.

6. The health monitoring system according to claim 1, wherein the at least one sensor and the reporting means each independently further include a power supply.

7. The health monitoring system according to claim 1, wherein at least one of the two or more memory devices is integral with the at least one sensor.

8. The aircraft landing gear health monitoring system according to claim 1, further comprising:

a communication device operable to communicate with the at least one sensor and the processor, and to receive information relating to the real-time data, and the calculated current condition of the at least one component.

9. The health monitoring system according to claim 1 wherein the processor is further operable to determine subsequent maintenance for the at least one replaceable component in dependence upon the calculated condition.

10. The health monitoring system according to claim 1, wherein the real-time data comprises measured loads associated with the at least one replaceable component.

11. The health monitoring system according to claim 1, further comprising at least one signal conditioning device operable to receive and process the real-time data from the at least one sensor into a processor readable form and operable to transmit the processed real-time data to the at least one processor.

12. The health monitoring system according to claim 11, wherein the system comprises a plurality of sensors and one signal conditioning device operable to receive real-time data independently from each sensor and operable to transmit the real-time data to the at least one processor.

13. The health monitoring system according to claim 11, wherein the system comprises a plurality of sensors and a plurality of signal conditioning devices, each signal conditioning device operable to receive real-time data from one of the sensors.

14. An aircraft landing gear health monitoring system for monitoring a plurality of replaceable landing gear components of the aircraft landing gear system, the system comprising:

a plurality of sub-systems each comprising:

a plurality of sensors each independently connected to separate replaceable components of a pre-determined sub-system of the aircraft landing gear and operable to measure real-time data associated with the status of each replaceable component when the aircraft power is switched on and when the aircraft power is switched off; and a processor connected to the plurality of sensors for receiving the real-time data therefrom and operable to determine the current condition of the sub-system by comparing the real-time data to pre-determined stored health data associated with each replaceable component of the sub-system, the pre-determined health data including data relating to the historic condition of each replaceable component, including actual fatigue and historic load conditions, the current condition comprising the probability of failure and the remaining useful life of the sub-system;

each replaceable component of the landing gear structure including an electronic memory device attached thereto for storing the pre-determined health data associated with the replaceable component to which it is attached, wherein replacement of one of the replaceable components also replaces the attached electronic memory device and the pre-determined health data stored thereon, the electronic memory device being operable to transmit the stored data to at least one of the sensors, associated with the component, and the processor; and a reporting device connected to each of the sub-systems for receiving data therefrom and operable to report at least one of the real-time data and the current condition of each of the sub-systems.

15. The health monitoring system according to claim 14, wherein the processor of one sub-system is operable to receive real-time data from at least one of a processor of another sub-system and a sensor of another sub-system for use in the calculation of the current condition of the sub-system to which the processor relates.

16. The health monitoring system according to claim 14, further comprising at least one communication device connected to the plurality of sub-systems and to each respective reporting device to relay information therebetween.

17. The health monitoring system according to claim 14, wherein the reporting device is operable to report the current condition of each component within each sub-system.

18. The health monitoring system according to claim 14, wherein the reporting device is at least one of a display device located in the aircraft cockpit, a ground-based system, and a display device located within the aircraft and accessible by at least one crew member.

19. The health monitoring system according to claim 14, wherein the plurality of sub-systems are connected to the aircraft power for recharging and are operable to transmit the recorded data to an aircraft avionics system when the aircraft avionics system is on.

20. The health monitoring system according to claim 14, wherein each of the plurality of sub-systems further comprise at least one memory device for storing at least one of the real-time data and the analysed data.

21. The health monitoring system according to claim 14, wherein the at least one of the plurality of replaceable components of the aircraft landing gear system is selected from the group consisting of tires, brakes, hydraulics, electronics, landing gear doors, oil pressure, oil temperature, oil level, shock strut position, loads, strain gauges, structural integrity, magnetic permeability, brake pressure, aircraft bus data including airplane velocity, position, attitude and altitude.

22. A method for monitoring and diagnosing the health of an aircraft landing gear system having two or more replaceable components, the method comprising the steps of:
  (i) measuring real-time data associated with the status of at least one replaceable component of the aircraft landing gear system;
  (ii) transmitting the real-time data to a processor for processing;
  (iii) processing the real-time data and pre-determined health data associated with the at least one replaceable component, the pre-determined health data including data relating to the historic condition of the at least one replaceable component, including actual fatigue and historic load conditions, to calculate a current condition of the at least one replaceable component, the current condition comprising the probability of failure and the remaining useful life of the at least one replaceable component for determining if any maintenance is required;
  (iv) recording the calculated condition of the at least one replaceable component and storing the calculated condition on an electronic memory device attached to the at least one component, each of the two or more replaceable components having an attached electronic memory wherein replacement of the at least one replaceable component also replaces the attached electronic memory device and the pre-determined health data stored thereon; and
  (v) reporting at least one of the real-time data, the calculated condition and any required maintenance.

23. The method according to claim 22, further comprising the additional step of transmitting at least one of the real-time data, the calculated condition and any required maintenance to a ground-based master landing gear database.

24. The method according to claim 22, wherein the reporting step (v) includes reporting to at least one of the aircraft personnel and the ground-based personnel.

25. The method according to claim 22, comprising performing steps (i) through (iv) while the aircraft is in flight.

26. The method according to claim 22, comprising performing steps (i) through (iv) while the aircraft is on the ground.

27. The method according to claim 22, wherein recording real-time data further comprises recording real-time data associated with the status of a plurality of components contained within a pre-determined sub-system of the aircraft landing gear system and wherein calculating the current condition further comprises calculating the current condition of the sub-system.

* * * * *